United States Patent
Kim et al.

(10) Patent No.: US 9,242,677 B2
(45) Date of Patent: Jan. 26, 2016

(54) SHOCK ABSORBER HOUSING FOR VEHICLE

(71) Applicant: Hyundai Motor Company, Seoul (KR)

(72) Inventors: Kyeong Jae Kim, Hwaseong-si (KR); Yun Chang Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/098,247

(22) Filed: Dec. 5, 2013

(65) Prior Publication Data

US 2014/0375085 A1    Dec. 25, 2014

(30) Foreign Application Priority Data

Jun. 21, 2013 (KR) .................. 10-2013-0071857

(51) Int. Cl.
*B60J 7/00* (2006.01)
*B62D 25/08* (2006.01)

(52) U.S. Cl.
CPC .................................. *B62D 25/088* (2013.01)

(58) Field of Classification Search
CPC ............ B60G 2500/10; B60G 15/063; B60G 2204/12422; B60G 2204/128; B60G 2400/5182; B60G 2600/26; B60G 2400/252; E21B 17/07
USPC ........... 296/193.09, 203.02, 203.01; 267/140, 267/179, 220, 221; 280/124.155, 124.154, 280/124.179
See application file for complete search history.

(56) References Cited

U.S. PATENT DOCUMENTS

| 3,857,307 | A | * | 12/1974 | Hegel | 81/176.15 |
| 3,893,702 | A | * | 7/1975 | Keijzer et al. | 280/124.154 |
| 4,108,469 | A | * | 8/1978 | Schwarzbich | 280/124.155 |
| 4,248,454 | A | * | 2/1981 | Cotter et al. | 280/124.155 |
| 4,635,906 | A | * | 1/1987 | Buma | 267/218 |
| 4,732,365 | A | * | 3/1988 | Kloster | 254/10.5 |
| 4,798,370 | A | * | 1/1989 | Inuzuka | 267/220 |
| 5,342,029 | A | * | 8/1994 | Carter | 267/220 |
| 6,588,780 | B2 | * | 7/2003 | Hayashi et al. | 280/124.147 |
| 6,616,160 | B2 | * | 9/2003 | Tadano | 280/124.147 |
| 6,640,942 | B2 | * | 11/2003 | Wakita | 188/321.11 |
| 6,843,352 | B2 | * | 1/2005 | Jacoby et al. | 188/321.11 |
| 6,921,126 | B2 | * | 7/2005 | Suh et al. | 296/192 |
| 7,350,779 | B2 | * | 4/2008 | Tamura | 267/220 |
| 7,854,473 | B2 | * | 12/2010 | Kuroita et al. | 296/203.02 |
| 8,002,334 | B2 | * | 8/2011 | Bechtold et al. | 296/192 |
| 8,813,924 | B2 | * | 8/2014 | Matsumura | 188/321.11 |
| 8,894,079 | B2 | * | 11/2014 | Matsumura et al. | 280/124.155 |
| 2003/0168888 | A1 | * | 9/2003 | Decker et al. | 296/198 |
| 2005/0093286 | A1 | * | 5/2005 | Oh | 280/788 |

(Continued)

FOREIGN PATENT DOCUMENTS

| JP | 62-4619 | A | 1/1987 |
| JP | 3096006 | B2 | 8/2000 |

(Continued)

*Primary Examiner* — Kiran B Patel
(74) *Attorney, Agent, or Firm* — Morgan, Lewis & Bockius LLP

(57) ABSTRACT

A shock absorber housing for a vehicle, which is provided in a vehicle body, encloses a shock absorber, and is coupled to the shock absorber so that the shock absorber is mounted in the vehicle body, may include a housing cap which covers an upper end of the shock absorber housing, and is coupled to an upper end of the shock absorber, wherein the housing cap includes a curved surface portion extending from the upper end and formed in a curved surface shape that is convex upward.

4 Claims, 4 Drawing Sheets

(56) References Cited

U.S. PATENT DOCUMENTS

| | | | |
|---|---|---|---|
| 2013/0147149 A1* | 6/2013 | Baker et al. | 280/124.155 |
| 2014/0049019 A1* | 2/2014 | Ahn et al. | 280/124.155 |
| 2014/0049072 A1* | 2/2014 | Kim et al. | 296/193.09 |
| 2014/0097590 A1* | 4/2014 | Yoo et al. | 280/124.155 |

FOREIGN PATENT DOCUMENTS

| | | |
|---|---|---|
| JP | 2001-99211 A | 4/2001 |
| KR | 100452489 B1 | 10/2004 |
| KR | 100579109 B1 | 5/2006 |

\* cited by examiner

SHOCK ABSORBER HOUSING FOR VEHICLE

CROSS-REFERENCE TO RELATED APPLICATION

The present application claims priority to Korean Patent Application No. 10-2013-0071857 filed on Jun. 21, 2013, the entire contents of which is incorporated herein for all purposes by this reference.

BACKGROUND OF THE INVENTION

1. Field of the Invention

The present invention relates to a shock absorber housing for a vehicle, and more particularly, to a shock absorber housing for a vehicle of which rigidity with respect to a load is increased.

2. Description of Related Art

In addition, a shock absorber is a constituent element of a suspension system, and provided to absorb or attenuate a load inputted from a road surface when the vehicle is driven.

In other words, the shock absorber refers to an apparatus that stabilizes a vehicle body from an external load. In addition, the shock absorber softens an operation of a spring, which receives a load and offsets the received load, and attenuates vibration of the spring.

A shock absorber housing refers to a housing installed on a front side member of the vehicle body, and the shock absorber is mounted in the housing. The shock absorber is mounted in the shock absorber housing, the suspension system is supported on the periphery of the shock absorber housing, and therefore it is required for the shock absorber housing to have high rigidity in comparison with other portions of the vehicle body.

However, if the shock absorber housing does not secure rigidity thereof or does not smoothly distribute the inputted load, driving stability and ride comfort of the vehicle may deteriorate. Meanwhile, when a thickness of the shock absorber housing is increased or additional constituent elements are used in order to secure rigidity of the shock absorber housing, spatial utility may deteriorate. Moreover, a weight of the shock absorber housing may be increased, and fuel efficiency of the vehicle may be degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shock absorber housing for a vehicle of which rigidity is secured.

In addition, various aspects of the present invention are directed to providing a shock absorber housing for a vehicle which reduces a weight and a thickness thereof and smoothly distributes a load.

In an aspect of the present invention, a shock absorber housing for a vehicle, which is provided in a vehicle body, encloses a shock absorber, and is coupled to the shock absorber so that the shock absorber is mounted in the vehicle body, may include a housing cap which covers an upper end of the shock absorber housing, and is coupled to an upper end of the shock absorber, wherein the housing cap may include a curved surface portion extending from the upper end and formed in a curved surface shape that is convex upward.

An outer edge of the curved surface portion is formed in a circular shape.

An outer edge of the curved surface portion is formed so that the upper end of the shock absorber housing, which is coupled to the housing cap, is disposed within a region of the curved surface portion.

In another aspect of the present invention, a shock absorber housing for a vehicle, which is provided in a vehicle body so as to enclose a shock absorber, coupled to the shock absorber so that the shock absorber is mounted in the vehicle body, and may have an upper end that is provided with a housing cap which is coupled to a strut of the shock absorber, wherein the housing cap may include a curved surface portion which is formed in a curved surface shape that is convex upward toward a central axis of the shock absorber, a seating surface which extends from the curved surface portion and is formed in a shape which corresponds to a part of an upper end of the shock absorber so that a part of the upper end of the shock absorber is seated on the seating surface, a mounting portion which may have a flat surface shape recessed downward from the curved surface portion, and comes into contact with a contact surface disposed lower than the upper end of the shock absorber, and a mounting hole which is formed in the mounting portion so that a coupling member, which couples the shock absorber and the housing cap to each other, is engaged with the mounting hole.

The housing cap may further include a seating hole formed in the seating surface so as to pass through the central axis of the shock absorber.

An outer edge of the curved surface portion is formed in a circular shape, and the seating surface is formed in a circular shape concentric with the circular shape of the curved surface portion.

The mounting portion is formed in plural numbers, and the plurality of mounting portions is radially formed on the curved surface portion on the basis of the central axis of the shock absorber.

When an virtual flat surface is set which is formed to be vertical to the central axis at an arbitrary point that is spaced apart downward from the strut of the shock absorber, the curved surface portion is formed so that a distance from the virtual flat surface up to an upper surface of the strut is smaller than a distance from the virtual flat surface up to the mounting hole, and equal to or greater than a distance from the virtual flat surface up to a lowermost end of the curved surface portion, and the distance from the virtual flat surface up to the mounting hole is equal to or smaller than a distance from the virtual flat surface up to an intersection point of an extension surface of the curved surface portion and the central axis.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
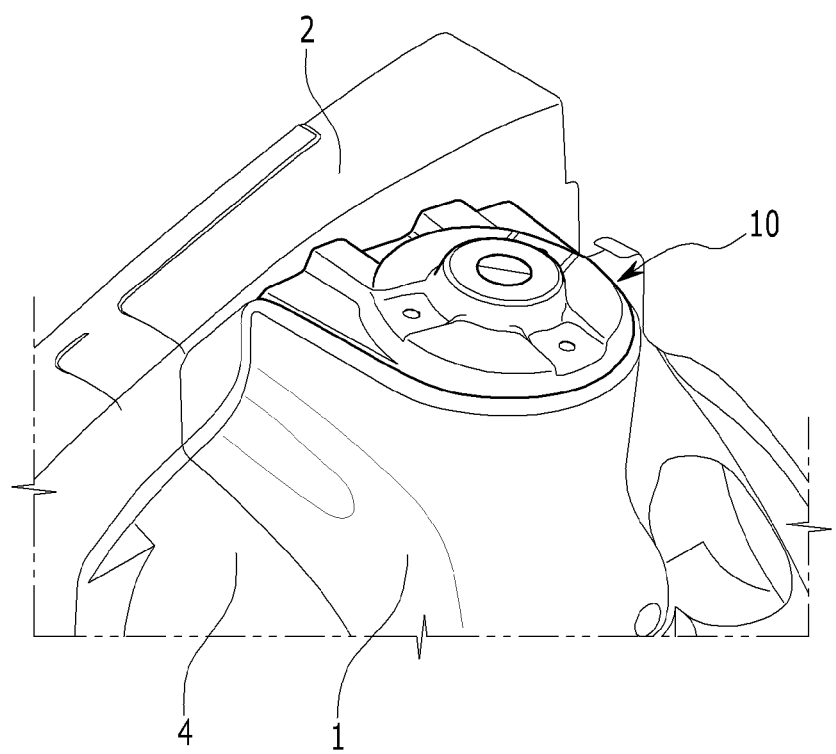
FIG. 1 is a perspective view of a shock absorber housing according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a shock absorber housing according to an exemplary embodiment of the present invention.

As illustrated in FIG. 1, a shock absorber housing 1 according to an exemplary embodiment of the present invention is mounted on a front side member 2 and a fender apron 4, and includes a housing cap 10.

The front side member 2 refers to a member that forms a structure of a front body. The front side members 2 are mounted at a front floor that configures a bottom of a front portion of a vehicle interior, and at both sides of a front portion of a lower portion of a dash board that partitions the front body and the vehicle interior. The front side member 2 has a structure that mainly blocks impact acting on a suspension system. Here, the front body is a part on which an engine, a front wheel suspension system, a radiator, a steering gear box, and the like of a vehicle body are mounted.

The fender apron 4 refers to a part that is positioned inside a fender and partitions portions where a wheel and an engine compartment are positioned, respectively. In addition, the fender apron 4 supports a force transmitted from the suspension system, and protects various components.

Because the front body, the front side member 2, and the fender apron 4 are obvious to a person of an ordinary skill in the art (hereinafter, referred to as a person skilled in the art), a more detailed description thereof will be omitted.

The shock absorber housing 1 is coupled to a lateral portion of the front side member 2 and an upper portion of the fender apron 4 by a spot welding method.

The housing cap 10 is a part that covers an upper side of the shock absorber housing 1.

Figure 3:
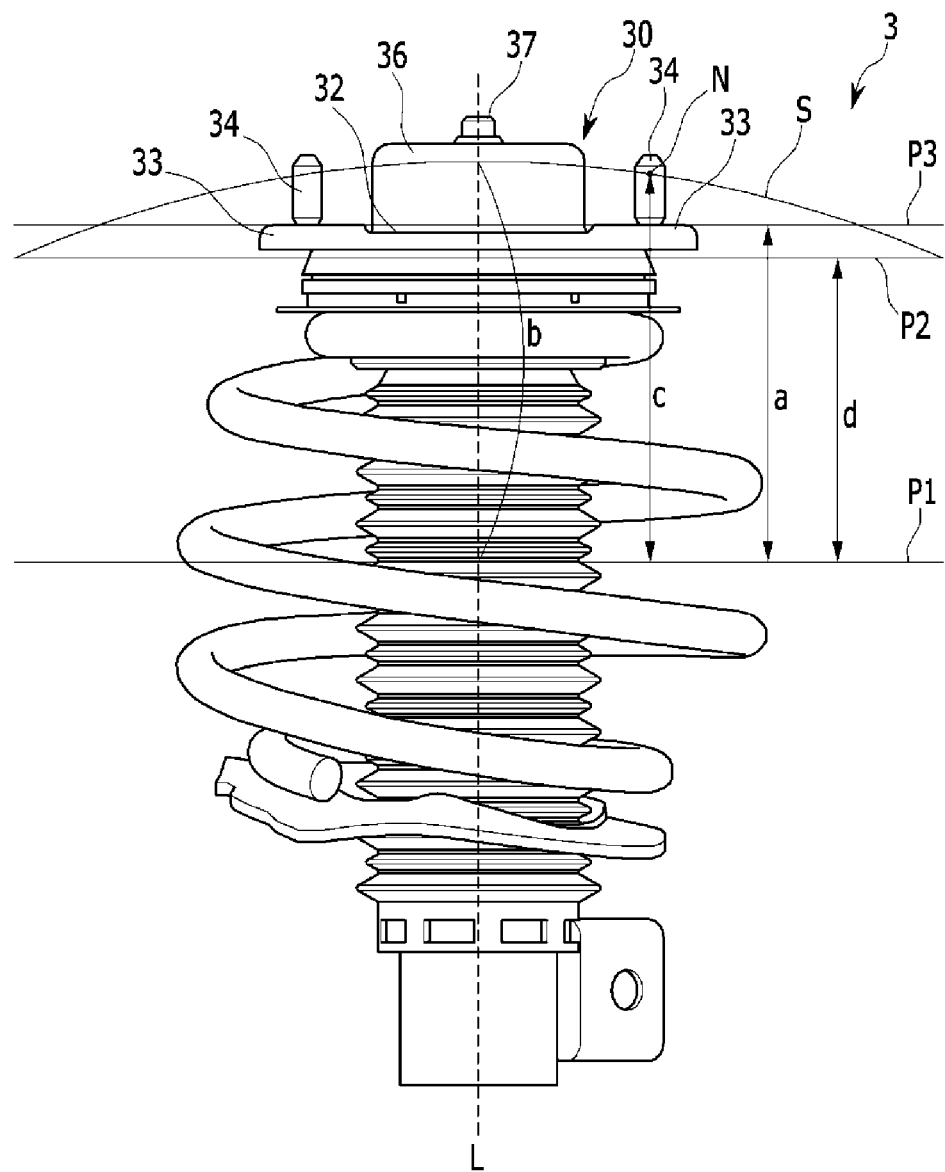
FIG. 3 is a schematic view illustrating a disposition of a curved surface portion of the housing cap and a shock absorber according to the exemplary embodiment of the present invention.
Figure 4:
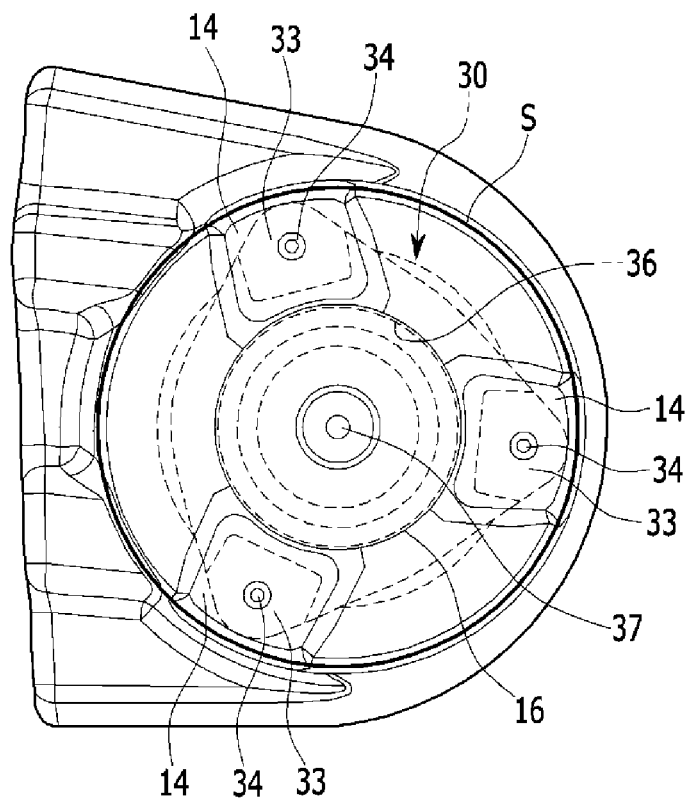
FIG. 4 is a top plan view of the shock absorber housing and the shock absorber according to the exemplary embodiment of the present invention.

Meanwhile, a shock absorber 3 is disposed in the shock absorber housing 1, and an upper end of the shock absorber 3 is mounted to the housing cap 10 (see FIGS. 3 and 4).

Figure 2:
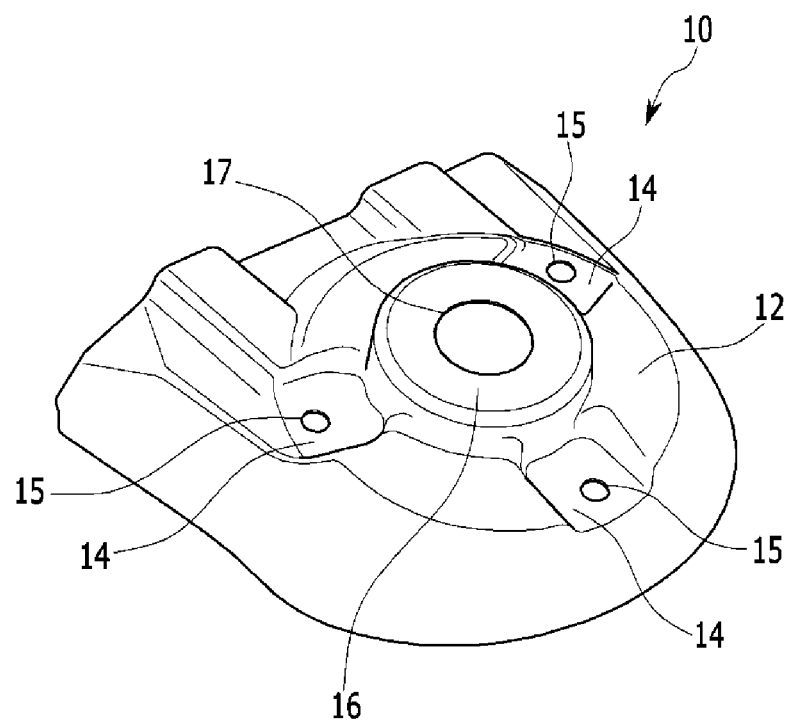
FIG. 2 is a perspective view of a housing cap of the shock absorber housing according to the exemplary embodiment of the present invention.

FIG. 2 is a perspective view of the housing cap of the shock absorber housing according to the exemplary embodiment of the present invention.

As illustrated in FIG. 2, the housing cap 10 includes a curved surface portion 12, mounting portions 14, coupling holes 15, a seating surface 16, and a seating hole 17.

The curved surface portion 12 refers to a partial region of a circular shape of an upper surface of the housing cap 10. That is, the curved surface portion 12 is a part of the upper surface of the housing cap 10, and has a circular-shaped edge. In addition, the curved surface portion 12 is formed in a gentle curved surface shape that becomes gradually convex upward as close to a center of the circular shape.

The mounting portion 14 is a portion to which the shock absorber 3 is mounted. In addition, the mounting portion 14 is formed in plural numbers, and the plurality of mounting portions 14 is radially formed within a region of the curved surface portion 12. Moreover, the mounting portion 14 is formed in a flat surface shape in order to easily mount the shock absorber 3. Therefore, the mounting portion 14 may have a shape recessed downward from the curved surface portion 12.

The coupling hole 15 refers to a hole formed in the mounting portion 14. In addition, the coupling hole 15 is formed so that a coupling means for coupling the mounting portion 14 and the shock absorber 3 to each other may be engaged with the coupling hole 15.

The seating surface 16 is formed so that the upper end of the shock absorber 3 is seated on the seating surface 16. In addition, the seating surface 16 may be formed in a shape that corresponds to a shape of the upper end of the shock absorber 3. Moreover, the seating surface 16 may have a circular shape concentric with the circular shape of the curved surface portion 12, and may be formed at a central portion of the circular shape of the curved surface portion 12. Furthermore, the seating surface 16 may be formed in a shape that protrudes upward from the curved surface portion 12.

The seating hole 17 refers to a hole that has a circular shape concentric with the circular shape of the seating surface 16, and is formed in a central portion of the circular shape of the curved surface portion 12. In addition, the seating hole 17 is formed to prevent a load, which is transmitted through a central axis L of the shock absorber 3, from being directly transmitted to the housing cap 10. That is, the central axis L of the shock absorber 3 is disposed so that an extension line of the central axis L passes through the seating hole 17 (see FIG. 3).

Meanwhile, the shapes of the seating surface 16 and the seating hole 17 may be variously changed in accordance with a design of a person skilled in the art.

FIG. 3 is a schematic view illustrating a disposition of the curved surface portion of the housing cap and the shock absorber according to the exemplary embodiment of the present invention, and FIG. 4 is a top plan view of the shock absorber housing and the shock absorber according to the exemplary embodiment of the present invention.

As illustrated in FIGS. 3 and 4, the shock absorber 3 includes a coupling portion 30. In addition, the coupling portion 30 is provided on the upper end of the shock absorber 3 that is coupled to the housing cap 10.

Meanwhile, the coupling portion 30 refers to a strut by which the shock absorber 3 is supported on the shock absorber housing 1. Because a function of the strut of the shock absorber 3 is obvious to a person skilled in the art, a detailed description thereof will be omitted.

The coupling portion 30 includes a coupling surface 32, contact surfaces 33, coupling protrusions 34, a seating portion 36, and an axis center protrusion 37.

The coupling surface 32 is formed to be coupled to the housing cap 10. In addition, the coupling surface 32 refers to a flat surface that is vertical to the central axis L of the shock absorber 3. That is, the coupling surface 32 is formed in a flat surface shape that is extended outward from the central axis L of the shock absorber 3.

The contact surface 33 is formed on the coupling surface 32. In addition, the contact surface 33 comes into contact with the mounting portion 14 of the housing cap 10. Moreover, the contact surface 33 is formed in plural numbers, the plurality of contact surfaces 33 is radially formed from the central axis L of the shock absorber 3, and the number of contact surfaces 33 is the same as the number of mounting portions 14. Areas and shapes of the coupling surface 32 and the contact surface 33 may be set by a person skilled in the art.

The coupling protrusion 34 is formed on the contact surface 33. In addition, the coupling protrusion 34 protrudes upward from the contact surface 33. Moreover, the coupling protrusion 34 penetrates the coupling hole 15 so that the shock absorber 3 and the housing cap 10 are coupled to each other. Meanwhile, the coupling protrusion 34 may have a bolt shape. In addition, the bolt-shaped coupling protrusion 34, which has penetrated the coupling hole 15, is engaged with a nut, such that the shock absorber 3 and the housing cap 10 may be coupled to each other.

The seating portion 36 may be formed at a central portion of the coupling surface 32. That is, the seating portion 36 is formed at a portion of the central axis L of the shock absorber 3. In addition, the seating portion 36 is formed in a shape that corresponds to the shape of the seating surface 16. Moreover, the seating portion 36 comes into contact with the seating surface 16, and is seated on the seating surface 16.

The axis center protrusion 37 protrudes upward from the seating portion 36. In addition, the axis center protrusion 37 is provided on the central axis L of the shock absorber 3. Moreover, the axis center protrusion 37 is provided to couple the coupling portion 30 to the shock absorber 3. Meanwhile, the axis center protrusion 37 is disposed to pass through the seating hole 17.

Hereinafter, a disposition of the curved surface portion 12 of the housing cap 10 and the shock absorber 3 will be described in detail with reference to FIGS. 3 and 4.

In FIGS. 3 and 4, the shape of the curved surface portion 12 is depicted by a design reference line S. In addition, the design reference line S is an extension line of the curved surface portion 12 according to the exemplary embodiment of the present invention. That is, the curved surface portion 12 is designed on the basis of the design reference line S.

As illustrated in FIG. 3, the design reference line S has a curved surface shape that is convex upward toward the central axis L of the shock absorber 3.

In FIG. 3, first, second, and third virtual surfaces P1, P2, and P3, and an virtual point N are illustrated.

The first virtual surface P1 refers to an virtual flat surface formed to be vertical to the central axis L of the shock absorber 3 at an arbitrary point which is spaced apart downward from the coupling portion 30 of the shock absorber 3.

The second virtual surface P2 refers to an virtual flat surface which comes into contact with a lowermost end of the design reference line S, which is convex upward, and is formed to be vertical to the central axis L of the shock absorber 3.

The third virtual surface P3 refers to an virtual flat surface which comes into contact with the contact surface 33 of the shock absorber 3, and is formed to be vertical to the central axis L of the shock absorber 3.

The virtual point N refers to an intersection point where the design reference line S and the coupling protrusion 34 of the shock absorber 3 intersect. In addition, the virtual point N refers to a portion where the housing cap 10 and the coupling protrusion 34 are engaged with each other, and may coincide with a position of the coupling hole 15.

In other words, as the coupling hole 15 is formed in the mounting portion 14 which is recessed downward from the curved surface portion 12, the virtual point N refers to an uppermost point where the coupling hole 15, which is a portion where the housing cap 10 and the coupling protrusion 34 are engaged with each other, may be positioned.

A distance (a) from the first virtual surface P1 up to the third virtual surface P3 is smaller than a distance (c) from the first virtual surface P1 up to the virtual point N, and equal to or greater than a distance (d) from the first virtual surface P1 up to the second virtual surface P2. In addition, the distance (c) from the first virtual surface P1 up to the virtual point N is equal to or smaller than a distance (b) from the first virtual surface P1 up to an intersection point of the design reference line S and the central axis L.

As illustrated in FIG. 4, an outer edge of the design reference line S is formed so that the coupling portion 30 of the shock absorber 3 is disposed within a region of the design reference line S. In addition, in the top plan view, the outer edge of the design reference line S may have a circular shape. However, the present invention is not limited thereto, and the shape of the outer edge of the curved surface portion 12 of the housing cap 10 may be changed by a person skilled in the art.

According to the exemplary embodiment of the present invention as described above, rigidity of the shock absorber housing 1 is secured such that driving stability of the vehicle may be improved. In addition, a weight and a thickness of the shock absorber housing 1 are decreased such that fuel efficiency of the vehicle may be improved. Moreover, a load of the shock absorber housing 1 is smoothly distributed such that performance of the suspension system including the shock absorber 3 may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorber housing for a vehicle, which is provided in a vehicle body so as to enclose a shock absorber, coupled to the shock absorber so that the shock absorber is mounted in the vehicle body, and having an upper end provided with a housing cap coupled to a coupling portion of the shock absorber, wherein the housing cap includes:

a curved surface portion formed in a curved surface shape that is convex upward toward a central axis of the shock absorber;

a seating surface extending from the curved surface portion and is formed in a shape corresponding to a part of an upper end of the coupling portion of the shock absorber so that a portion of the upper end of the coupling portion is seated on the seating surface;

a mounting portion having a flat surface shape recessed downward from the curved surface portion, and coming into contact with a contact surface disposed lower than the upper end of the coupling portion; and a coupling hole formed in the mounting portion so that a coupling member, which couples the shock absorber and the housing cap to each other, is engaged with the coupling hole, wherein a virtual flat surface formed to be vertical to the central axis of the shock absorber, is positioned at an arbitrary point spaced apart downward from the coupling portion of the shock absorber, and wherein a design reference line for the curved surface portion is formed so that a distance between the virtual flat surface up to an upper surface of the contact surface is smaller than a distance from the virtual flat surface up to the coupling hole, and equal to or greater than a distance from the virtual flat surface up to a lowermost end of the design reference line, and the distance from the virtual flat surface up to the coupling hole is equal to or smaller than a distance from the virtual flat surface up to an intersection point of an extension surface of the design reference line and the central axis.

2. The shock absorber housing of claim 1, wherein the housing cap further includes a seating hole formed in the seating surface so as to pass through the central axis of the shock absorber.

3. The shock absorber housing of claim 1, wherein an outer edge of the curved surface portion is formed in a circular shape, and the seating surface is formed in a circular shape concentric with the circular shape of the curved surface portion.

4. The shock absorber housing of claim 1, wherein the mounting portion is formed in plural numbers, and the plurality of mounting portions is radially formed on the curved surface portion on the basis of the central axis of the shock absorber.

* * * * *